US007055603B2

(12) United States Patent
Caveny et al.

(10) Patent No.: US 7,055,603 B2
(45) Date of Patent: Jun. 6, 2006

(54) CEMENT COMPOSITIONS COMPRISING STRENGTH-ENHANCING LOST CIRCULATION MATERIALS AND METHODS OF CEMENTING IN SUBTERRANEAN FORMATIONS

(75) Inventors: William J. Caveny, Rush Springs, OK (US); Rickey L. Morgan, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 240 days.

(21) Appl. No.: 10/669,634

(22) Filed: Sep. 24, 2003

(65) Prior Publication Data

US 2005/0061505 A1  Mar. 24, 2005

(51) Int. Cl.
*E21B 33/138* (2006.01)

(52) U.S. Cl. ..................................... 166/294
(58) Field of Classification Search ............... None
See application file for complete search history.

(56) References Cited

U.S. PATENT DOCUMENTS

| 2,250,107 | A | 7/1941 | Nelles | 106/97 |
| 3,042,608 | A | 7/1962 | Morris | 252/8.5 |
| 3,132,693 | A | 5/1964 | Weisend | 166/33 |
| 3,180,748 | A | 4/1965 | Holmgren et al. | 106/104 |
| 3,359,225 | A | 12/1967 | Weisend | 260/29.6 |
| 3,782,985 | A | 1/1974 | Gebbhardt | 106/97 |
| 3,901,316 | A | 8/1975 | Knapp | 166/250 |
| 4,011,909 | A | 3/1977 | Adams et al. | 166/293 |
| 4,015,991 | A | 4/1977 | Persinski et al. | 106/90 |
| 4,022,731 | A | 5/1977 | Schmitt | 260/29.6 E |
| 4,107,057 | A | 8/1978 | Dill et al. | 252/8.55 C |
| 4,111,710 | A | 9/1978 | Pairaudeau et al. | 106/90 |
| 4,256,503 | A | 3/1981 | Tsuda et al. | 106/100 |
| 4,304,298 | A | 12/1981 | Sutton | 166/293 |
| 4,310,486 | A | 1/1982 | Cornwell et al. | 264/309 |
| 4,340,427 | A | 7/1982 | Sutton | 106/87 |
| 4,367,093 | A | 1/1983 | Burkhalter et al. | 106/87 |
| 4,397,354 | A | 8/1983 | Dawson et al. | 166/294 |
| 4,433,731 | A | 2/1984 | Chatterji et al. | 166/293 |
| 4,435,216 | A | 3/1984 | Diehl et al. | 106/97 |
| 4,450,010 | A | 5/1984 | Burkhalter et al. | 106/87 |
| 4,460,052 | A | 7/1984 | Gockel | 175/72 |
| 4,466,837 | A | 8/1984 | Chatterji et al. | 106/85 |
| 4,482,379 | A | 11/1984 | Dibrell et al. | 106/76 |
| 4,498,995 | A | 2/1985 | Gockel | 507/100 |
| 4,515,635 | A | 5/1985 | Rao et al. | 106/90 |
| 4,537,918 | A | 8/1985 | Parcevaux et al. | 523/130 |
| 4,554,081 | A | 11/1985 | Borchardt et al. | 252/8.5 A |
| 4,555,269 | A | 11/1985 | Rao et al. | 106/90 |
| 4,557,763 | A | 12/1985 | George et al. | 106/90 |
| 4,565,578 | A | 1/1986 | Sutton et al. | 106/87 |
| 4,596,834 | A | 6/1986 | Widener et al. | 521/83 |
| 4,632,186 | A | 12/1986 | Boncan et al. | 166/293 |
| 4,635,724 | A | 1/1987 | Bruckdorfer et al. | 166/268 |
| 4,640,942 | A | 2/1987 | Brothers | 523/130 |
| 4,676,317 | A | 6/1987 | Fry et al. | 166/293 |
| 4,687,516 | A | 8/1987 | Burkhalter et al. | 106/90 |
| 4,700,780 | A | 10/1987 | Brothers | 166/293 |
| 4,703,801 | A | 11/1987 | Fry et al. | 166/293 |
| 4,721,160 | A | 1/1988 | Parcevaux et al. | 166/293 |
| 4,742,094 | A | 5/1988 | Brothers et al. | 523/130 |
| 4,767,460 | A | 8/1988 | Parcevaux et al. | 106/90 |
| 4,784,223 | A | 11/1988 | Worrall et al. | 166/287 |
| 4,791,989 | A | 12/1988 | Brothers et al. | 166/293 |
| 4,806,164 | A | 2/1989 | Brothers | 106/90 |
| 4,818,288 | A | 4/1989 | Aignesberger et al. | 106/90 |
| 4,888,120 | A | 12/1989 | Mueller et al. | 252/8.551 |
| 4,916,012 | A | 4/1990 | Sawanobori et al. | 428/367 |
| 4,927,462 | A | 5/1990 | Sugama | 106/99 |
| 4,931,489 | A | 6/1990 | Kucera et al. | 523/130 |
| 5,032,181 | A | 7/1991 | Chung | 106/717 |
| 5,110,853 | A | 5/1992 | Van-Det et al. | 524/375 |
| 5,120,367 | A | 6/1992 | Smith et al. | 106/823 |
| 5,147,565 | A | 9/1992 | Bour et al. | 252/8.551 |
| 5,149,370 | A | 9/1992 | Olaussen et al. | 106/737 |
| 5,151,131 | A | 9/1992 | Burkhalter et al. | 106/822 |
| 5,159,980 | A | 11/1992 | Onan et al. | 166/294 |
| 5,185,389 | A | 2/1993 | Victor | 524/2 |
| 5,250,578 | A | 10/1993 | Cornwell | 521/83 |
| 5,258,222 | A | 11/1993 | Crivelli | 428/323 |
| 5,307,876 | A | 5/1994 | Cowan et al. | 166/293 |
| 5,339,903 | A | 8/1994 | Eoff et al. | 166/293 |
| 5,340,397 | A | 8/1994 | Brothers | 106/727 |
| 5,340,860 | A | 8/1994 | Brake et al. | 524/166 |
| 5,383,967 | A | 1/1995 | Chase | 106/737 |
| 5,391,226 | A | 2/1995 | Frankowski | 106/696 |
| 5,439,057 | A | 8/1995 | Weaver et al. | 166/295 |

(Continued)

FOREIGN PATENT DOCUMENTS

CN  86 1 06211 A  4/1988

(Continued)

OTHER PUBLICATIONS

Webpage from TXI Energy Services, available at http://www.txi.com/default_3.tpl?id1=3&id2=20&id3=38, website visited Sep. 5, 2003.

(Continued)

*Primary Examiner*—Zakiya W. Bates
(74) *Attorney, Agent, or Firm*—Craig W. Roddy; Baker Botts L.L.P.

(57) ABSTRACT

Cement compositions comprising a strength-enhancing lost circulation material, and methods for cementing using such cement compositions are provided. Exemplary embodiments of the cement compositions comprise cement, water, and a strength-enhancing lost circulation material. Optionally, other additives suitable for inclusion in cement compositions may be added.

45 Claims, No Drawings

U.S. PATENT DOCUMENTS

| | | | |
|---|---|---|---|
| 5,453,310 A | 9/1995 | Andersen et al. | 428/34.4 |
| 5,456,751 A | 10/1995 | Zandi et al. | 106/724 |
| 5,464,060 A * | 11/1995 | Hale et al. | 166/293 |
| 5,494,513 A | 2/1996 | Fu et al. | 106/672 |
| 5,547,506 A | 8/1996 | Rae et al. | 106/730 |
| 5,558,161 A | 9/1996 | Vitthal et al. | 166/280 |
| 5,588,489 A | 12/1996 | Chatterji et al. | 166/293 |
| 5,599,857 A | 2/1997 | Allen | 524/3 |
| 5,624,489 A | 4/1997 | Fu et al. | 106/692 |
| 5,680,900 A | 10/1997 | Nguyen et al. | 166/295 |
| 5,696,059 A | 12/1997 | Onan et al. | 507/269 |
| 5,749,418 A | 5/1998 | Mehta et al. | 166/292 |
| 5,779,787 A | 7/1998 | Brothers et al. | 106/802 |
| 5,791,380 A | 8/1998 | Onan et al. | 138/149 |
| 5,820,670 A | 10/1998 | Chatterji et al. | 106/727 |
| 5,900,053 A | 5/1999 | Brothers et al. | 106/678 |
| 5,968,255 A | 10/1999 | Mehta et al. | 106/727 |
| 5,972,103 A | 10/1999 | Mehta et al. | 106/728 |
| 5,988,279 A | 11/1999 | Udarbe et al. | 166/293 |
| 5,989,336 A | 11/1999 | Carpenter et al. | 106/811 |
| 5,996,694 A | 12/1999 | Dewprashad et al. | 166/294 |
| 6,063,738 A | 5/2000 | Chatterji et al. | 507/269 |
| 6,143,069 A | 11/2000 | Brothers et al. | 106/678 |
| 6,170,575 B1 | 1/2001 | Reddy et al. | 166/293 |
| 6,182,758 B1 | 2/2001 | Vijn | 166/293 |
| 6,220,354 B1 | 4/2001 | Chatterji et al. | 166/293 |
| 6,230,804 B1 | 5/2001 | Mueller et al. | 166/293 |
| 6,245,142 B1 | 6/2001 | Reddy et al. | 106/724 |
| 6,268,406 B1 | 7/2001 | Chatterji et al. | 523/130 |
| 6,279,652 B1 | 8/2001 | Chatterji et al. | 166/194 |
| 6,308,777 B1 | 10/2001 | Chatterji et al. | 166/293 |
| 6,332,921 B1 | 12/2001 | Brothers et al. | 106/692 |
| 6,379,456 B1 | 4/2002 | Heathman et al. | 106/724 |
| 6,405,801 B1 | 6/2002 | Vijn et al. | 166/293 |
| 6,457,524 B1 | 10/2002 | Roddy | 166/293 |
| 6,458,198 B1 | 10/2002 | Baret et al. | 106/644 |
| 6,478,869 B1 | 11/2002 | Reddy et al. | 106/724 |
| 6,488,763 B1 | 12/2002 | Brothers et al. | 106/692 |
| 6,494,951 B1 | 12/2002 | Reddy et al. | 106/705 |
| 6,497,283 B1 | 12/2002 | Eoff et al. | 166/293 |
| 6,500,252 B1 | 12/2002 | Chatterji et al. | 106/644 |
| 6,508,306 B1 | 1/2003 | Reddy et al. | 166/295 |
| 6,516,883 B1 | 2/2003 | Chatterji et al. | 166/293 |
| 6,516,884 B1 | 2/2003 | Chatterji et al. | 166/294 |
| 6,569,232 B1 | 5/2003 | Castro et al. | 106/644 |
| 6,689,208 B1 | 2/2004 | Brothers | 106/794 |
| 2004/0171499 A1* | 9/2004 | Ravi et al. | 507/200 |

FOREIGN PATENT DOCUMENTS

| | | |
|---|---|---|
| EP | 0 157 055 A2 | 10/1985 |
| EP | 0538989 A2 | 4/1993 |
| WO | WO 00/20350 | 4/2000 |
| WO | WO 01/25163 A1 | 4/2001 |

OTHER PUBLICATIONS

Halliburton brochure entitled "Halad®-9 Fluid-Loss Additive", 1999.

Halliburton brochure entitled "Halad®-14 Fluid-Loss Additive", 1999.

Halliburton brochure entitled "Halad®-22A Fluid-Loss Additive", 1998.

Halliburton brochure entitled "Halad®-23 Fluid-Loss Additive", 2000.

Halliburton brochure entitled "Halad®-322 Fluid-Loss Additive", 1999.

Halliburton brochure entitled "Halad®-344 Fluid-Loss Additive", 1998.

Halliburton brochure entitled "Halad®-413 Fluid-Loss Additive", 1999.

Halliburton brochure entitled "Halad®-447 Fluid-Loss Additive", 1999.

Halliburton brochure entitled "Halad®-567 Fluid-Loss Additive", 2000.

Halliburton brochure entitled "Halad®-600 E+ Fluid-Loss Additive", 1999.

Halliburton brochure entitled "Halad®-700 Fluid-Loss Additive", 2000.

Halliburton brochure entitled Fluid-Loss Additives, Our Case for Halliburton Additives is Water Tight, 1994.

SPE 10623 entitled "Acrylamide/Acrylic Acid Copolymers for Cement Fluid Loss Control" by Lee McKenzie et al, 1982.

Halliburton brochure "HR®-25 Cement Retarder", 1999.

Halliburton brochure entitled "Silicalite Cement Additive", 1999.

Product Data Sheet entitled "Secar 60", Jan. 2001.

Publication entitled "Rubber-Tire Particles As Concrete Aggregate" by Neil Eldn et al. published in the Journal of Materials in Civil Engineering, vol. 5, No. 4, pp. 479-496, Nov. 1993.

Publication entitled "The Properties of Rubberized Concretes" by I. Topcu published in the Cement and Concrete Research Journal, vol. 25, No. 2, pp. 304-310, 1995.

Publication entitled "Hot Alkali Carbonation of Sodium Metaphosphate Fly Ash/Calcium Aluminate Blend Hydrothermal Cements" by T. Sugama published in the Cement and Concrete Research Journal, vol. 26, No. 11, pp. 1661-1672, 1996.

Publication entitled "Mullite Microsphere-Filled Lightweight Calcium Phosphate Cement Slurries For Geothermal Wells: Setting and Properties" by T. Sugama et al. published in the Cement and Concrete Research Journal, vol. 25, No. 6, pp. 1305-1310, 1995.

Publication entitled "Carbonation of Hydrothermally Treated Phosphate-Bonded Calcium Aluminate Cement" by T. Sugama, et al. published under the auspieces of the U.S. Department of Energy, Washington, D.C. under contract No. DEA-AC02-76CH00016, undated, but admitted to be prior art.

Publication entitled "Lightweight CO2-Resistant Cements for Geothermal Well Completions" by Lawrence E. Kukacka et al., publisher unknown and undated, but admitted to be prior art.

Publication entitled "Microsphere-Filled Lightweight Calcium Phosphate Cement" by Toshifumi Sugama et al. under teh auspices of the U.S. Department of Energy, Washington, D.C. under contract No. DE-AC02-76 CH00016; undated but admitted to be prior art.

Publication entitled "Interfaces and Mechanical Behaviors of Fiber-Reinforced Calcium Phosphate Cement Compositions" by T. Sugama, et al. prepared for the Geothermal Division U.S. Department of Energy; Department of Applied Science, Jun. 1992, but admitted to be prior art, Jun. 1992.

Publication entitled "Calcium Phosphate Cements Prepared by Acid-Base Reaction" by Toshifumi Suagama et al. published in the Journal of the American Ceramic Society vol. 75, No. 8, pp. 2076-2087, 1992.

Publication entitled "TXI Energy Services Introduces Pressur-Seal™ Hi Performance Lost Circulation Material", Aug. 12, 1998.

Halliburton brochure entitled "Latex 2000 Cement Additive", 1998.

Halliburton brochure entitled "Pozmix® A Cement Additive", 1999.
Halliburton brochure entitled "Spherelite Cement Additive", 1999.
Halliburton brochure entitled "Thermalock™ Cement for Corrosive $CO_2$ Environments", 1999.
Halliburton brochure entitled "STEELSEAL©", undated but admitted to be prior art.
Halliburton brochure entitled "New Lost Circulation Solution", undated but admitted to be prior art.
Halliburton brochure entitled "FlexPlug<sup>SM</sup> Service", 1998.
Halliburton brochure entitled "Lost Circulation Treatment . . . ", 2001.
Halliburton brochure entitled "Tuf Additive No. 2", 1999.
Halliburton brochure entitled "Granulite TR 1/4", 1999.
Halliburton brochure entitled "FlexPlug© W", 1999.
Halliburton brochure entitled "FlexPlug© OBM", 1999.
Halliburton brochure entitled Spherelite, 1999.
Halliburton brochure entitled "Flocele", 1999.
Halliburton brochure entitled "Gilsonite", 1999.
Halliburton brochure entitled "Perlite", 1999.
Halliburton brochure entitled "Bentonite Cement Diesel Oil Slurry (BCDO)", 2000.
Halliburton brochure entitled "Flo-Chek© Service", 2000.
Halliburton brochure entitled "Bengum Squeeze", 2000.
Halliburton brochure entitled "Kwik-Seal©", 2002.
Foreign communication from a related counterpart application dated Jun. 1, 2005.

* cited by examiner

CEMENT COMPOSITIONS COMPRISING STRENGTH-ENHANCING LOST CIRCULATION MATERIALS AND METHODS OF CEMENTING IN SUBTERRANEAN FORMATIONS

BACKGROUND OF THE INVENTION

1. Field of the Invention

The present invention relates to subterranean cementing operations, and more particularly, to cement compositions comprising strength-enhancing lost circulation materials, and methods of using such cementing compositions in subterranean formations.

2. Description of the Related Art

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surface of the pipe string to the walls of the well bore. Hydraulic cement compositions also are used in remedial cementing operations such as plugging highly permeable zones or fractures in well bores, plugging cracks and holes in pipe strings, and the like.

Subterranean formations transversed by well bores are often weak, highly permeable, and extensively fractured. In some cases, such formations may be unable to withstand the hydrostatic head pressure normally associated with fluids (e.g., cement compositions and the like) being injected into the formation. In such cases, the hydrostatic pressure may be sufficient to force such fluids into the fractures and/or permeable zones of the formation, which may result in a significant loss of fluid into the formation. This loss of fluid circulation is problematic for a number of reasons. For example, where the loss of circulation occurs during a cementing operation, excessive fluid loss may cause a cement composition to be prematurely dehydrated and may decrease the compressive strength of the cement composition. Excessive fluid loss into the formation may also prevent or reduce bond strength between the set cement composition and the subterranean zone, the walls of pipe, and/or the walls of the well bore.

Previous attempts to minimize the loss of circulation into the subterranean formation involved the addition to the cement composition of a variety of additives including, but not limited to, asphaltines, ground coal, cellulosic, plastic materials, and the like. The addition of such additives was an attempt to plug or bridge the fractures and/or the permeable zones in the formation where the treatment fluids are typically lost. However, during a cementing operation, the addition of the lost circulation materials often has been detrimental to the compressive strength of the cement composition because, inter alia, such additives do not bond to the cement. Because one function of the cement is to support the pipe string in the well bore, such reduction in the compressive strength of the cement composition is undesirable.

SUMMARY OF THE INVENTION

The present invention relates to subterranean cementing operations, and more particularly, to cement compositions comprising strength-enhancing lost circulation materials, and methods of using such cementing compositions in subterranean formations.

An example of a method of the present invention is a method of cementing in a subterranean formation comprising the steps of: providing a cement composition comprising cement, a strength-enhancing lost circulation material, and water; placing the cement composition into a subterranean formation; and allowing the cement composition to set.

An example of a composition of the present invention is a cement composition comprising: cement, a strength-enhancing lost circulation material, and water.

The features and advantages of the present invention will be readily apparent to those skilled in the art upon a reading of the description of the preferred embodiments which follows.

DESCRIPTION OF PREFERRED EMBODIMENTS

The present invention relates to subterranean cementing operations, and more particularly, to cement compositions comprising strength-enhancing lost circulation materials, and methods of using such cementing compositions in subterranean formations.

The improved cement compositions of the present invention generally comprise cement, water, and a strength-enhancing lost circulation material. Optionally, other additives suitable for use in conjunction with subterranean cementing operations may be added to these cement compositions if desired. Typically, the cement compositions of the present invention have a density in the range of from about 4 lb/gallon to about 20 lb/gallon. In certain exemplary embodiments, the cement compositions of the present invention have a density in the range of from about 8 lb/gallon to about 17 lb/gallon. One of ordinary skill in the art with the benefit of this disclosure will recognize the appropriate density of the cement composition for a chosen application.

The water utilized in the cement compositions of the present invention can be fresh water, salt water (e.g., water containing one or more salts dissolved therein), brine (e.g., saturated salt water), or seawater. Generally, the water can be from any source provided that it does not contain an excess of compounds, e.g., dissolved organics, that may adversely affect other components in the cement composition. The density of the water may vary based, inter alia, on the salt content. In certain exemplary embodiments, the water has a density in the range of from about 8.3 lb/gallon to about 9.5 lb/gallon. Further, the water may be present in an amount sufficient to form a pumpable slurry. In certain exemplary embodiments, the water is present in the cement compositions in an amount in the range of from about 30% to about 180% by weight of the cement ("bwoc") therein. In certain exemplary embodiments, the water is present in the cement composition in the range of from about 40% to about 90% bwoc therein. In certain exemplary embodiments, the water is present in the cement composition in the range of from about 40% to about 50% bwoc therein. One of ordinary skill in the art with the benefit of this disclosure will recognize the appropriate amount of water for a chosen application.

Any cements suitable for use in subterranean applications are suitable for use in the present invention. In one embodiment, the improved cement compositions of the present invention comprise a hydraulic cement. A variety of hydraulic cements are suitable for use including those comprised of calcium, aluminum, silicon, oxygen, and/or sulfur which set and harden by reaction with water. Such hydraulic cements include, but are not limited to, Portland cements, pozzolana cements, gypsum cements, soil cements, calcium phosphate cements, high alumina content cements, silica cements, high alkalinity cements, and mixtures thereof.

The cement compositions of the present invention further comprise a strength-enhancing lost circulation material. The strength-enhancing lost circulation material may be any material that provides a desired level of lost circulation control from the cement composition into the formation with minimal adverse impact to the compressive strength of the cement composition. Among other things, certain embodiments of the strength-enhancing lost circulation material of the present invention bridge and/or plug fractures and permeable zones in the formation so as to minimize loss of fluid circulation into the formation. Certain exemplary embodiments of the strength-enhancing lost circulation material of the present invention have a density such that they do not rise to the surface of the well bore if circulation of the cement composition should cease. Generally, the strength-enhancing lost circulation material chemically and/or mechanically bonds to the matrix of the cement. Generally, the strength-enhancing lost circulation material may have any particle size distribution that provides a desired level of lost circulation control. In an exemplary embodiment, the strength-enhancing lost circulation material may have a particle size distribution in the range of from about 37 micrometers to about 4,750 micrometers. In an exemplary embodiment, the strength-enhancing lost circulation material is vitrified shale. A variety of vitrified shales are suitable for use including those comprised of silicon, aluminum, calcium, and/or magnesium. In an exemplary embodiment, the vitrified shale may be fine grain vitrified shale whereby the fine vitrified shale particles may have a particle size distribution in the range of from about 74 micrometers to about 4,750 micrometers. An example of a suitable fine grain vitrified shale is "PRESSUR-SEAL® FINE LCM," which is commercially available from TXI Energy Services, Inc., in Houston, Tex. In an exemplary embodiment, the vitrified shale may be coarse grain vitrified shale whereby the coarse vitrified shale particles may have a particle size distribution in the range of from about 149 micrometers to about 4,750 micrometers. An example of a suitable coarse grain vitrified shale is "PRESSUR-SEAL® COARSE LCM," which is commercially available from TXI Energy Services, Inc., in Houston, Tex.

Generally, the strength-enhancing lost circulation material may be present in the cement compositions in an amount sufficient to provide a desired level of lost circulation control. In one embodiment, the strength-enhancing lost circulation material is present in the cement composition in an amount in the range of from about 1% to about 50% bwoc. In certain exemplary embodiments, the strength-enhancing lost circulation material is present in the cement composition in an amount in the range of from about 5% to about 10% bwoc. One of ordinary skill in the art with the benefit of this disclosure will recognize the appropriate amount of the strength-enhancing lost circulation material for a chosen application.

Optionally, the cement composition may further comprise a conventional lost circulation material. The conventional lost circulation material may be any material that minimizes the loss of fluid circulation into the fractures and/or permeable zones of the formation. Conventional lost circulation materials typically comprise a variety of materials, which include, but are not limited to, asphaltines, ground coal, cellulosic, plastic materials, and the like. The conventional lost circulation materials may be provided in particulate form. One of ordinary skill in the art with the benefit of this disclosure will recognize the appropriate amount of the conventional lost circulation material for a chosen application.

Additional additives may be added to the cement compositions of the present invention as deemed appropriate by one skilled in the art with the benefit of this disclosure. Examples of such additives include, inter alia, fly ash, silica compounds, fluid loss control additives, a surfactant, a dispersant, an accelerator, a retarder, a salt, mica, fiber, a formation conditioning agent, fumed silica, bentonite, expanding additives, microspheres, weighting materials, a defoamer, and the like. For example, the cement compositions of the present invention may be foamed cement compositions wherein an expanding additive that produces gas within the cement composition has been added in order, inter alia, to reduce such composition's density. An example of a suitable expanding additive comprises a blend containing gypsum and is commercially available under the tradename "MICROBOND" from Halliburton Energy Services, Inc. at various locations. One of ordinary skill in the art with the benefit of this disclosure will recognize the proper amount of an expanding additive to use in order to provide a foamed cement composition having a desired density. An example of a suitable fluid loss control additive comprises an acrylamide copolymer derivative, a dispersant, and a hydratable polymer, and is disclosed in commonly owned U.S. patent application Ser. No. 10/608,748 filed on Jul. 21, 2003, the relevant disclosure of which is hereby incorporated herein by reference. An example of a suitable fly ash is an ASTM class F fly ash which is commercially available from Halliburton Energy Services of Dallas, Tex. under the trade designation "POZMIX® A."

An exemplary embodiment of a cement composition of the present invention comprises cement, a strength-enhancing lost circulation material, and water. An exemplary embodiment of a cement composition of the present invention comprises cement, vitrified shale, and water. An exemplary embodiment of a cement composition of the present invention comprises Texas Lehigh Premium cement, 5% PRESSUR-SEAL® FINE LCM bwoc, and 39.4% water bwoc. Another exemplary embodiment of a cement composition of the present invention comprises Texas Lehigh Premium cement, 5% PRESSUR-SEAL® COARSE LCM bwoc, and 39.4% water bwoc.

An exemplary embodiment of a method of the present invention comprises providing a cement composition that comprises cement, a strength-enhancing lost circulation material, and water sufficient to form a pumpable slurry;

placing this cement composition into a subterranean formation; and allowing the cement composition to set therein. Another exemplary embodiment of a method of the present invention comprises providing a cement composition that comprises cement, vitrified shale, and water sufficient to form a pumpable slurry; placing this cement composition into a subterranean formation; and allowing the cement composition to set therein.

To facilitate a better understanding of the present invention, the following examples of some of the preferred embodiments are given. In no way should such examples be read to limit the scope of the invention.

EXAMPLE 1

Sample cement compositions were prepared by mixing a base cement slurry with a lost circulation material in accordance with the following procedure. The base cement slurry of 16.4 lb/gallon was prepared by mixing Texas Lehigh Premium cement with 39.4% water bwoc. Each sample cement composition was then prepared by mixing the base cement slurry with 5% of a lost circulation material bwoc. Subsequently, each sample cement composition was mixed at 15,000 rpm in a Waring blender for approximately 35 seconds. After sample preparation, a compressive strength test was performed at 80° F. and 200° F. in accordance with API Specification 10, RP 8.3, Recommended Practices for Testing Well Cements.

Sample Cement Composition No. 1 consisted of the base cement slurry. No lost circulation material was included. At 80° F., the compressive strength of Sample Cement Composition No. 1 was found to be 1641 psi. At 200° F., the compressive strength of Sample Cement Composition No. 1 was found to be 4823 psi.

Sample Cement Composition No. 2 was prepared by mixing the base cement slurry with 5% of a strength-enhancing lost circulation material bwoc. Specifically, the strength enhancing lost circulation material included was PRESSUR-SEAL® COARSE LCM. At 80° F., the compressive strength of Sample Cement Composition No. 2 was found to be 1591 psi. At 200° F., the compressive strength of Sample Cement Composition No. 2 was found to be 4351 psi.

Sample Cement Composition No. 3 was prepared by mixing the base cement slurry with 5% of a strength-enhancing lost circulation material bwoc. Specifically, the strength-enhancing lost circulation material included was PRESSUR-SEAL® FINE LCM. At 80° F., the compressive strength of Sample Cement Composition No. 3 was found to be 1560 psi. At 200° F., the compressive strength of Sample Cement Composition No. 3 was found to be 5637 psi.

Sample Cement Composition No. 4 was prepared by mixing the base cement slurry with 5% of a conventional lost circulation material bwoc. Specifically, the conventional lost circulation material included was asphaltine. At 80° F., the compressive strength of Sample Cement Composition No. 4 was found to be 1309 psi. At 200° F., the compressive strength of Sample Cement Composition No. 4 was found to be 3749 psi.

Sample Cement Composition No. 5 was prepared by mixing the base cement slurry with 5% of a conventional lost circulation material bwoc. Specifically, the conventional lost circulation material included was ground FORMICA® material. At 80° F., the compressive strength of Sample Cement Composition No. 5 was found to be 1165 psi. At 200° F., the compressive strength of Sample Cement Composition No. 5 was found to be 3140 psi.

A summary of the compressive strength demonstrated by each sample cement composition is depicted in Table 1, below.

TABLE 1

| FLUID | COMPRESSIVE STRENGTH AT 80° F. (psi) | % CHANGE IN COMPRESSIVE STRENGTH AT 80° F. | COMPRESSIVE STRENGTH AT 200° F. (psi) | % CHANGE IN COMPRESSIVE STRENGTH AT 200° F. |
|---|---|---|---|---|
| Sample Cement Composition No. 1 | 1641 | N/A | 4823 | N/A |
| Sample Cement Composition No. 2 | 1591 | −3% | 4351 | −9% |
| Sample Cement Composition No. 3 | 1560 | −5% | 5637 | +17% |
| Sample Cement Composition No. 4 | 1309 | −20% | 3749 | −23% |
| Sample Cement Composition No. 5 | 1165 | −29% | 3140 | −35% |

Thus, the above example demonstrates, inter alia, that the cement compositions of the present invention comprising a strength-enhancing lost circulation material provide enhanced compressive strength as compared to cement compositions comprising conventional lost circulation materials.

EXAMPLE 2

An additional compressive strength test was performed on another cement composition, Sample Cement Composition No. 6, that was prepared as follows.

The base cement slurry of 14 lb/gallon was prepared by mixing a 65/35 TXI Standard Cement/POZMIX® A blend with 93.8% water bwoc. Additionally, 9.8% of PRESSUR-SEAL® COARSE LCM bwoc, 0.4% HALAD®-344 additive bwoc, 0.4% bwoc of a fluid loss control additive comprising an acrylamide copolymer derivative, a dispersant, and a hydratable polymer, 0.5% D-AIR™ 3000 bwoc, 0.1% of a free water control agent bwoc, 7% MICROBOND bwoc, and 5% NaCl by weight of water were also blended into the sample cement composition. HALAD®-344 additive is a fluid loss control additive that is commercially available from Halliburton Energy Services, Inc., at various locations. D-AIR™ 3000 is a defoaming agent that is commercially available from Halliburton Energy Inc., at various locations.

After Sample Cement Composition No. 6 was prepared, it was pumped into a well bore at 100° F., 1,900 psi for 3 hours and 46 minutes and allowed to set therein. Next, a compressive strength test was performed at 110° F. at selected intervals over a 48 hour period in accordance with API Specification 10, RP 8.3, Recommended Practices for Testing Well Cement. A summary of the compressive strength demonstrated by Sample Cement Composition No. 6 at each interval is provided in Table 2, below.

TABLE 2

| FLUID | COMPRESSIVE STRENGTH AT 6 HOURS (psi) | COMPRESSIVE STRENGTH AT 12 HOURS (psi) | COMPRESSIVE STRENGTH AT 24 HOURS (psi) | COMPRESSIVE STRENGTH AT 48 HOURS (psi) |
|---|---|---|---|---|
| Sample Cement Composition No. 6 | 302 | 852 | 1500 | 2280 |

Thus, the above example demonstrates, inter alia, that Cement Composition No. 6, a cement composition of the present invention comprising a strength-enhancing lost circulation material, provides enhanced compressive strength.

Therefore, the present invention is well-adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of using a strength-enhancing lost circulation material to reduce the loss of circulation of a cement composition in a subterranean formation comprising the steps of:
    providing a cement composition comprising cement, a strength-enhancing lost circulation material, and water, wherein the cement is selected from the group consisting of Portland cements, pozzolana cements, gypsum cements, soil cements, calcium phosphate cements, high alumina content cements, silica cements, or high alkalinity cements;
    placing the cement composition into a subterranean formation;
    reducing the loss of circulation of the cement composition using the strength-enhancing lost circulation material of sufficient size to reduce the loss of circulation of the cement composition; and
    allowing the cement composition to set.

2. The method of claim 1 wherein the cement composition further comprises fly ash, a surfactant, a dispersant, an accelerator, a retarder, a salt, mica, fiber, a formation conditioning agent, fumed silica, bentonite, expanding additives, microspheres, weighting materials, or a defoamer.

3. The method of claim 1 wherein the cement composition has a density in the range of from about 4 pounds per gallon to about 20 pounds per gallon.

4. The method of claim 1 wherein the cement composition has a density in the range of from about 8 pounds per gallon to about 17 pounds per gallon.

5. The method of claim 1 wherein the water is present in the cement composition in an amount sufficient to form a pumpable slurry.

6. The method of claim 5 wherein the water is present in the cement composition in an amount in the range of from about 30% to about 180% by weight of the cement.

7. The method of claim 5 wherein the water is present in the cement composition in an amount in the range of from about 40% to about 50% by weight of the cement.

8. The method of claim 1 wherein the cement comprises a hydraulic cement.

9. The method of claim 1 wherein the strength-enhancing lost circulation material comprises vitrified shale.

10. The method of claim 9 wherein the vitrified shale is fine grain.

11. The method of claim 9 wherein the vitrified shale is coarse grain.

12. The method of claim 1 wherein the strength-enhancing lost circulation material has a particle size distribution in the range of from about 37 micrometers to about 4,750 micrometers.

13. The method of claim 1 wherein the strength-enhancing lost circulation material has a density such that the strength-enhancing lost circulation material does not rise to the surface of the well bore if circulation of the cement composition should cease.

14. The method of claim 1 wherein the strength-enhancing lost circulation material is present in the cement composition in an amount in the range of from about 1% to about 50% by weight of the cement.

15. The method of claim 1 wherein the strength-enhancing lost circulation material is present in the cement composition in an amount in the range of from about 5% to about 10% by weight of the cement.

16. The method of claim 1 wherein the strength-enhancing lost circulation material chemically bonds to the cement.

17. The method of claim 16 wherein the strength-enhancing lost circulation material mechanically bonds to the cement.

18. The method of claim 1 wherein the strength-enhancing lost circulation material mechanically bonds to the cement.

19. The method of claim 1 wherein the strength-enhancing lost circulation material enhances the lost circulation control characteristics and/or the compressive strength of the cement composition.

20. The method of claim 1 wherein the cement composition further comprises a conventional lost circulation material.

21. The method of claim 1 wherein the cement composition further comprises a fluid loss control additive.

22. The method of claim 21 wherein the fluid loss control additive comprises an acrylamide copolymer derivative, a dispersant, and a hydratable polymer.

23. The method of claim 1 wherein water is present in the cement composition in an amount in the range of from about 40% to about 50% by weight of the cement; wherein the strength-enhancing lost circulation material is present in the cement composition in an amount in the range of from about 5% to about 10% by weight of the cement; wherein the strength-enhancing lost circulation material is vitrified shale; wherein the vitrified shale has a particle size distribution in the range of from about 37 micrometers to about 4,750 micrometers; and wherein the cement composition has a density in the range of from about 4 pounds per gallon to about 20 pounds per gallon.

24. A method of cementing in a subterranean formation comprising the steps of:
    providing a cement composition comprising:
        cement, vitrified shale, and water, wherein the cement is selected from the group consisting of Portland cements, pozzolana cements, gypsum cements, soil cements, calcium phosphate cements, high alumina content cements, silica cements, or high alkalinity cements;

placing the cement composition into a subterranean formation;

using the vitrified shale to reduce the loss of cement composition into the subterranean formation; and allowing the cement composition to set.

25. The method of claim 24 wherein the cement composition further comprises fly ash, a surfactant, a dispersant, an accelerator, a retarder, a salt, mica, fiber, a formation conditioning agent, fumed silica, bentonite, expanding additives, microspheres, weighting materials, or a defoamer.

26. The method of claim 24 wherein the cement composition has a density in the range of from about 4 pounds per gallon to about 20 pounds per gallon.

27. The method of claim 24 wherein the cement composition has a density in the range of from about 8 pounds per gallon to about 17 pounds per gallon.

28. The method of claim 24 wherein the water is present in the cement composition in an amount sufficient to form a pumpable slurry.

29. The method of claim 28 wherein the water is present in the cement composition in an amount in the range of from about 30% to about 180% by weight of the cement.

30. The method of claim 28 wherein the water is present in the cement composition in an amount in the range of from about 40% to about 50% by weight of the cement.

31. The method of claim 24 wherein the cement comprises a hydraulic cement.

32. The method of claim 24 wherein the vitrified shale is fine grain.

33. The method of claim 24 wherein the vitrified shale is coarse grain.

34. The method of claim 24 wherein the vitrified shale has a particle size distribution in the range of from about 37 micrometers to about 4,750 micrometers.

35. The method of claim 24 wherein the vitrified shale has a density such that the vitrified shale does not rise to the surface of the well bore if circulation of the cement composition should cease.

36. The method of claim 24 wherein the vitrified shale is present in the cement composition in an amount in the range of from about 1% to about 50% by weight of the cement.

37. The method of claim 24 wherein the vitrified shale is present in the cement composition in an amount in the range of from about 5% to about 10% by weight of the cement.

38. The method of claim 24 wherein the vitrified shale chemically bonds to the cement.

39. The method of claim 38 wherein the vitrified shale mechanically bonds to the cement.

40. The method of claim 24 wherein the vitrified shale mechanically bonds to the cement.

41. The method of claim 24 wherein the vitrified shale enhances the lost circulation control characteristics and/or the compressive strength of the cement composition.

42. The method of claim 24 wherein the cement composition further comprises a conventional lost circulation material.

43. The method of claim 24 wherein the cement composition further comprises a fluid loss control additive.

44. The method of claim 43 wherein the fluid loss control additive comprises an acrylamide copolymer derivative, a dispersant, and a hydratable polymer.

45. The method of claim 24 wherein water is present in the cement composition in an amount in the range of from about 40% to about 50% by weight of the cement; wherein the vitrified shale is present in the cement composition in an amount in the range of from about 5% to about 10% by weight of the cement; wherein the vitrified has a particle size distribution in the range of from about 37 micrometers to about 4,750 micrometers; and wherein the cement composition has a density in the range of from about 4 pounds per gallon to about 20 pounds per gallon.

* * * * *